United States Patent
Pinedjian

(10) Patent No.: US 7,629,768 B2
(45) Date of Patent: Dec. 8, 2009

(54) EASY CLEANING C-SHAPED CHARGING BASE

(75) Inventor: Raffi Pinedjian, Fountain Valley, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 315 days.

(21) Appl. No.: 11/833,384

(22) Filed: Aug. 3, 2007

(65) Prior Publication Data
US 2009/0033279 A1 Feb. 5, 2009

(51) Int. Cl.
*H02J 7/00* (2006.01)
(52) U.S. Cl. ....................... 320/115; 320/108
(58) Field of Classification Search ................. 320/115, 320/108
See application file for complete search history.

(56) References Cited

U.S. PATENT DOCUMENTS

| | | | |
|---|---|---|---|
| 3,089,815 A | | 5/1963 | Lieb, et al. |
| 3,608,549 A | | 9/1971 | Merrill |
| 3,829,676 A | * | 8/1974 | Nelson et al. ............... 362/183 |
| 3,982,537 A | | 9/1976 | Bucalo |
| 4,007,742 A | | 2/1977 | Banko |
| 4,030,499 A | | 6/1977 | Bucalo |
| 4,054,138 A | | 10/1977 | Bucalo |
| 4,084,123 A | * | 4/1978 | Lineback et al. ............ 320/111 |
| 4,092,580 A | * | 5/1978 | Prinsze ....................... 320/115 |
| 4,122,850 A | | 10/1978 | Bucalo |
| 4,184,510 A | | 1/1980 | Murry et al. |
| 4,246,932 A | | 1/1981 | Raines |
| 4,265,618 A | | 5/1981 | Herskovitz et al. |
| 4,357,136 A | | 11/1982 | Herskovitz et al. |
| 4,392,827 A | | 7/1983 | Martin |
| 4,474,752 A | | 10/1984 | Haslam et al. |
| 4,484,915 A | | 11/1984 | Tartaglia |
| 4,582,488 A | | 4/1986 | Newman |

(Continued)

FOREIGN PATENT DOCUMENTS

EP 0348146 A1 12/1989

(Continued)

OTHER PUBLICATIONS

"Ultra™ 2800 Positive Displacement Dispenser"; 2004; EFD, Inc. Brochure XP 1104 vol. 11.10; 2 pages.

(Continued)

*Primary Examiner*—Patrick J Assouad
*Assistant Examiner*—Manuel Hernandez
(74) *Attorney, Agent, or Firm*—Kenneth D. Bassinger

(57) ABSTRACT

A charging base has a generally C-shaped housing and a charging element. The generally C-shaped housing has an upper part and a lower part. The upper part has an upper surface substantially parallel to a lower surface and an opening extending from the upper surface to the lower surface. The opening has a first width and a second width. A notch is located at the intersection of the first width and the second width. The lower part has a beveled surface generally parallel to and beneath the lower surface of the upper part. The charging element, which provides power to recharge a battery, is located beneath the beveled surface of the lower part. The opening and notch are configured to hold a rechargeable assembly alternately in a first charging position and a second ready position

19 Claims, 5 Drawing Sheets

U.S. PATENT DOCUMENTS

| | | | |
|---|---|---|---|
| 4,684,344 A | 8/1987 | Brockway et al. | |
| 4,704,088 A | 11/1987 | Newman | |
| 4,713,446 A | 12/1987 | DeVore et al. | |
| 4,795,423 A | 1/1989 | Osterholm | |
| 4,830,855 A | 5/1989 | Stewart | |
| 4,992,045 A | 2/1991 | Beisel | |
| 5,066,276 A | 11/1991 | Wang | |
| 5,120,307 A | 6/1992 | Wang | |
| 5,328,481 A | 7/1994 | Wang | |
| 5,336,175 A | 8/1994 | Mames | |
| 5,360,413 A | 11/1994 | Leason et al. | |
| 5,370,630 A | 12/1994 | Smidebush et al. | |
| 5,372,514 A * | 12/1994 | Odemer et al. | 439/136 |
| 5,476,511 A | 12/1995 | Gwon et al. | |
| 5,487,725 A | 1/1996 | Peyman | |
| 5,582,595 A | 12/1996 | Haber et al. | |
| 5,620,700 A | 4/1997 | Berggren et al. | |
| 5,743,886 A | 4/1998 | Lynn et al. | |
| 5,772,309 A * | 6/1998 | Groben | 362/183 |
| 5,773,019 A | 6/1998 | Ashton et al. | |
| 5,783,205 A | 7/1998 | Berggren et al. | |
| 5,824,072 A | 10/1998 | Wong | |
| 5,860,949 A | 1/1999 | Chen | |
| 5,928,663 A | 7/1999 | Peyman | |
| 5,952,814 A * | 9/1999 | Van Lerberghe | 320/108 |
| 5,984,889 A | 11/1999 | Christ et al. | |
| 6,210,357 B1 | 4/2001 | Morris | |
| 6,270,343 B1 | 8/2001 | Martin | |
| 6,290,690 B1 | 9/2001 | Huculak et al. | |
| 6,313,604 B1 * | 11/2001 | Chen | 320/114 |
| 6,372,245 B1 | 4/2002 | Bowman et al. | |
| 6,413,245 B1 | 7/2002 | Yaacobi et al. | |
| 6,419,656 B1 | 7/2002 | Vetter et al. | |
| 6,436,143 B1 | 8/2002 | Ross et al. | |
| 6,488,659 B1 | 12/2002 | Rosenman | |
| 6,585,700 B1 | 7/2003 | Trocki et al. | |
| 6,635,267 B1 | 10/2003 | Miyoshi et al. | |
| 6,645,179 B1 | 11/2003 | Ishikawa et al. | |
| 6,991,457 B2 | 1/2006 | Kazen et al. | |

FOREIGN PATENT DOCUMENTS

| | | |
|---|---|---|
| GB | 1551767 | 8/1979 |
| WO | WO 82/03761 A1 | 11/1982 |
| WO | WO 87/00029 A1 | 1/1987 |
| WO | WO 96/03978 A1 | 2/1996 |
| WO | WO 99/33853 A2 | 7/1999 |
| WO | WO 01/10482 A1 | 2/2001 |
| WO | WO 2006/050008 A1 | 5/2006 |

OTHER PUBLICATIONS

"Parker: Your Resource For Motion And Fluid Control Components, Systems and Solutions—System Solutions For Life Sciences"; 2003; Aurora Instruments, LLC Brochure; 8 pages.

U.S. Appl. No. 11/200,452, filed Aug. 9, 2005, Hopkins.

U.S. Appl. No. 11/435,906, filed May 17, 2005, Dacquay, et al.

U.S. Appl. No. 11/486,870, filed Jul. 14, 2006, Marsh, et al.

* cited by examiner

EASY CLEANING C-SHAPED CHARGING BASE

BACKGROUND OF THE INVENTION

The present invention relates to a charging base and more particularly to an easy cleaning C-shaped charging base for use with rechargeable medical devices.

Numerous medical and surgical devices include rechargeable batteries. These devices are used until the battery charge is depleted, when they must be recharged. The recharging process involves connecting the rechargeable battery to a power source in any of a number of different ways. In some cases, the battery is removed from the medical device and placed in a charger. In other cases, the battery is sealed inside the medical device or a rechargeable assembly that can be removed from the device and recharged.

In other cases, the rechargeable assembly may include components in addition to a battery or battery pack. In some devices, a disposable segment is attached to a reusable segment. This reusable segment includes a battery or battery pack in addition to other components that can be reused. For example, an actuator, controller, and other reusable components can be placed in a reusable assembly along with a battery pack. This reusable assembly may then be connected to a disposable assembly that includes parts that cannot be reused.

One commonly known example of this is the electric toothbrush. A typical electric toothbrush includes a reusable segment that includes a battery and components that drive the brushing action. The disposable segment includes the brush itself and various mechanical components that transfer motion to the brush. When the brush wears out, it can be discarded and another disposable brush segment can be attached.

The reusable segment, however, must be recharged using a charging base. Current charging bases are not designed to optimize sanitary conditions. Most charging bases include surfaces or interfaces that collect liquid and other debris. In addition, typical charging bases do not allow for placement of a device in an ergonomic position. It would be desirable to have a charging base that addresses these problems.

SUMMARY OF THE INVENTION

In one embodiment consistent with the principles of the present invention, the present invention is a charging base having a generally C-shaped housing and a charging element. The generally C-shaped housing has an upper part and a lower part. The upper part has an upper surface substantially parallel to a lower surface and an opening extending from the upper surface to the lower surface. The opening has a first width and a second width. A notch is located at the intersection of the first width and the second width. The lower part has a beveled surface generally parallel to and beneath the lower surface of the upper part. The charging element, which provides power to recharge a battery, is located beneath the beveled surface of the lower part. The opening and notch are configured to hold a rechargeable assembly alternately in a first charging position and a second ready position.

In another embodiment consistent with the principles of the present invention, the present invention is a charging system having a generally C-shaped housing, a charging element, and a rechargeable assembly. The generally C-shaped housing has an upper part and a lower part. The upper part has an upper surface substantially parallel to a lower surface and an opening extending from the upper surface to the lower surface. The opening has a first width and a second width. A notch is located at the intersection of the first width and the second width. The lower part has a beveled surface generally parallel to and beneath the lower surface of the upper part. The charging element, which provides power to recharge a battery, is located beneath the beveled surface of the lower part. The opening and notch are configured to hold the rechargeable assembly alternately in a first charging position and a second ready position. The rechargeable assembly has a generally tapered housing and a rechargeable battery located in the housing.

In another embodiment consistent with the principles of the present invention, the present invention is a charging system having a generally C-shaped housing, a charging element, and a rechargeable assembly. The generally C-shaped housing has an upper part and a lower part. The upper part has an upper surface substantially parallel to a lower surface and an opening extending from the upper surface to the lower surface. The opening has a first width and a second width. A notch is located at the intersection of the first width and the second width. The lower part has a beveled surface generally parallel to and beneath the lower surface of the upper part. The charging element, which provides power to recharge a battery, is located beneath the beveled surface of the lower part. The rechargeable assembly has a generally tapered housing and a rechargeable battery located in the housing. The opening and notch are configured to hold the rechargeable assembly alternately in a first charging position in which the rechargeable assembly is located over the charging element, and a second ready position in which the rechargeable assembly is located in a position that extends upward from the upper surface of the upper part.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference is now made in detail to the exemplary embodiments of the invention, examples of which are illustrated in the accompanying drawings. Wherever possible, the same reference numbers are used throughout the drawings to refer to the same or like parts.

Figure 1:
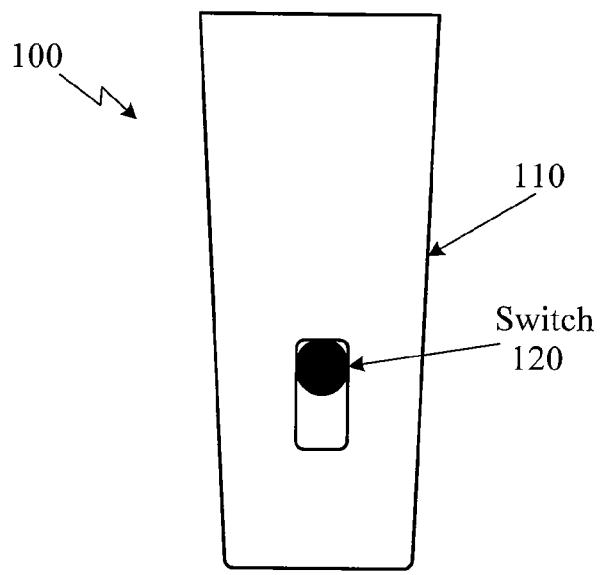
FIG. 1 is one view of a rechargeable assembly for use with a C-shaped charging base according to an embodiment of the present invention.

FIG. 1 is one view of a rechargeable assembly according to an embodiment of the present invention. In FIG. 1, rechargeable assembly 100 includes a housing 110 and a switch 120. Switch 120 is adapted to provide an input to a medical device system. For example, switch 120 may be used to activate a system or to initiate a process. Other switches, buttons, or user-directed control inputs are commonly known and may be employed with rechargeable assembly 100. Housing 110 is tapered as shown. Such a taper provides for positioning rechargeable assembly 100 in a charging base as detailed below.

Figure 2:
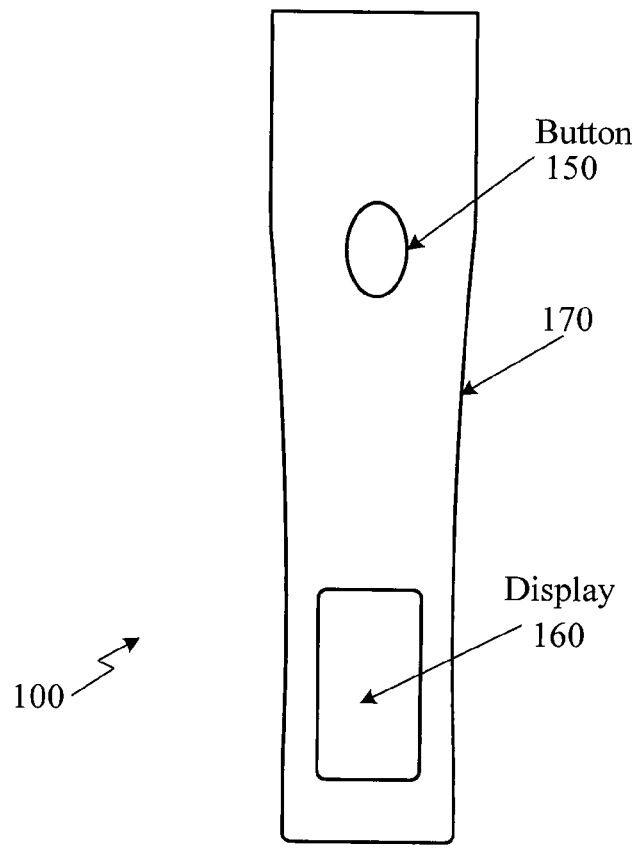
FIG. 2 is one view of a rechargeable assembly for use with a C-shaped charging base according to an embodiment of the present invention.

FIG. 2 is another embodiment of a rechargeable assembly according to the principles of the present invention. Rechargeable assembly 100 includes a button 150, a display 160, and a housing 170. Button 150 is actuated to provide an input to the system. As with switch 120, button 150 may activate a feature of the system. Display 160 is a liquid crystal display, segmented display, or other device that indicates a status or condition of the system. Housing 170 is tapered as shown. In this case the taper extends along a significant portion of rechargeable assembly 100 and is slightly curved. As described below, this taper allows for the ergonomic placement of rechargeable assembly in the charging base of the present invention.

Figure 3:
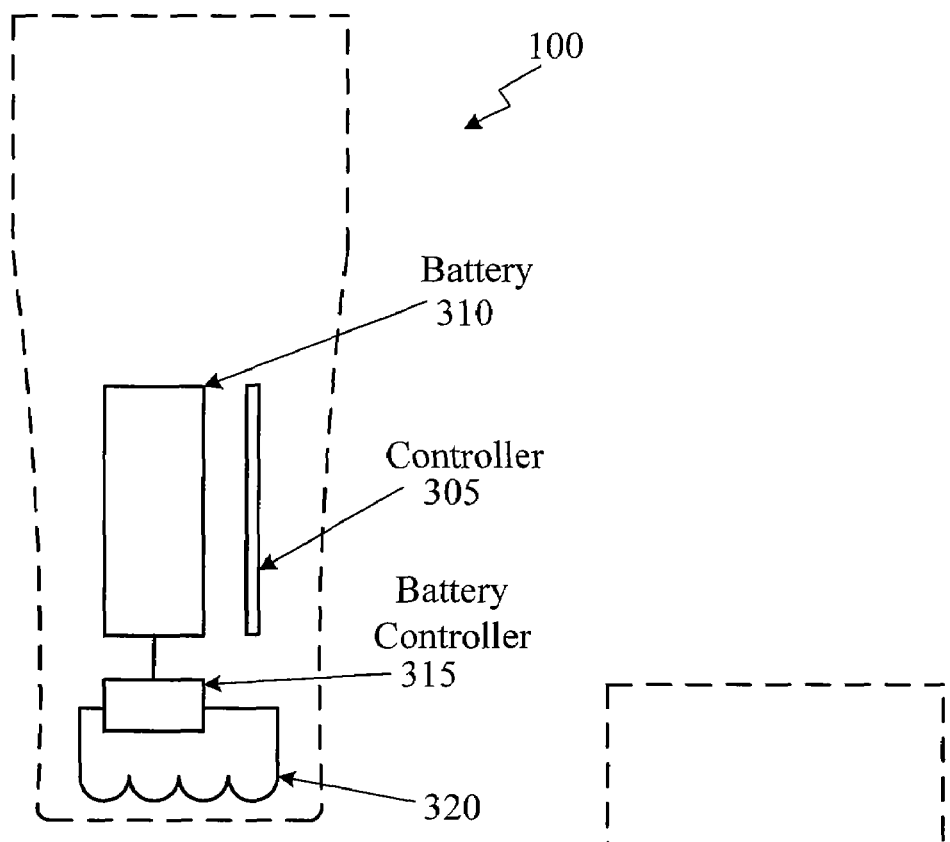
FIG. 3 is a cross section view of a rechargeable assembly for use with a C-shaped charging base according to an embodiment of the present invention.

FIG. 3 is a cross section view of a rechargeable assembly according to an embodiment of the present invention. In FIG. 3, rechargeable assembly 100 includes rechargeable battery 310, controller 305, battery controller 315, and inductive element 320.

Controller 305 is typically an integrated circuit with power, input, and output pins capable of performing logic functions. In various embodiments, controller 305 is a targeted device controller. In such a case, controller 305 performs specific control functions targeted to a specific device or component, such as a rechargeable battery. In other embodiments, controller 305 is a microprocessor. In such a case, controller 305 is programmable so that it can function to control more than one component of the device. In other cases, controller 305 is not a programmable microprocessor, but instead is a special purpose controller configured to control different components that perform different functions. While depicted as one component in FIG. 3, controller 305 may be made of many different components or integrated circuits.

Rechargeable battery 310 is typically a lithium ion battery, although other types of batteries may be employed. In addition, any other type of power cell is appropriate for rechargeable battery 310. Rechargeable battery 310 provides power to the medical device.

Battery controller 315 and inductive element 320 control the charging of rechargeable battery 310. Battery controller 315 includes circuitry that may perform any of a number of different functions related to the charging, monitoring, and maintenance of rechargeable battery 310. In other embodiments, Battery 315 may be implemented in or integrated into controller 305.

To charge rechargeable battery 310, a current is induced in inductive element 320 when it is placed near another inductive element in a charging base (not shown). This induced current charges rechargeable battery 310.

Figure 4:
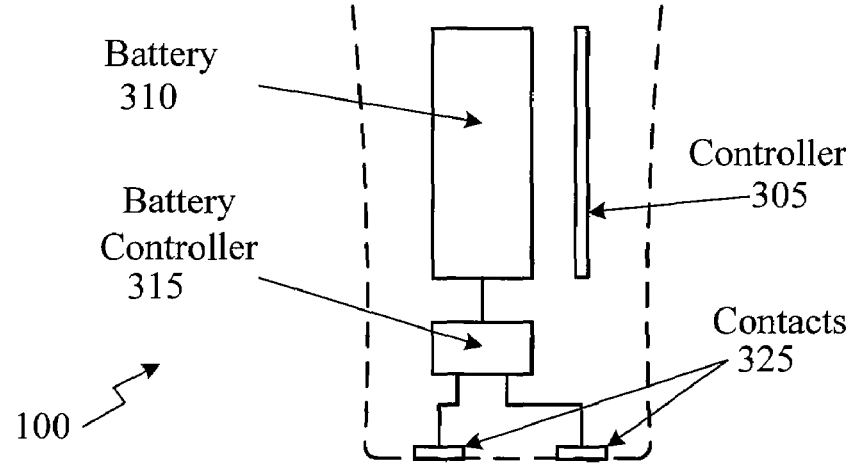
FIG. 4 is a cross section view of a rechargeable assembly for use with a C-shaped charging base according to an embodiment of the present invention.

FIG. 4 is a cross section view of a rechargeable assembly according to an embodiment of the present invention. In FIG. 4, rechargeable assembly 100 includes rechargeable battery 310, controller 305, battery controller 315, and charging contacts 325. In the embodiment of FIG. 13, contacts 325 interface with contacts on a charging base (not shown) to provide power to rechargeable battery 310. In one embodiment, contacts 325 are a mini-USB connection. Other types of connectors may also be used.

Figure 5:
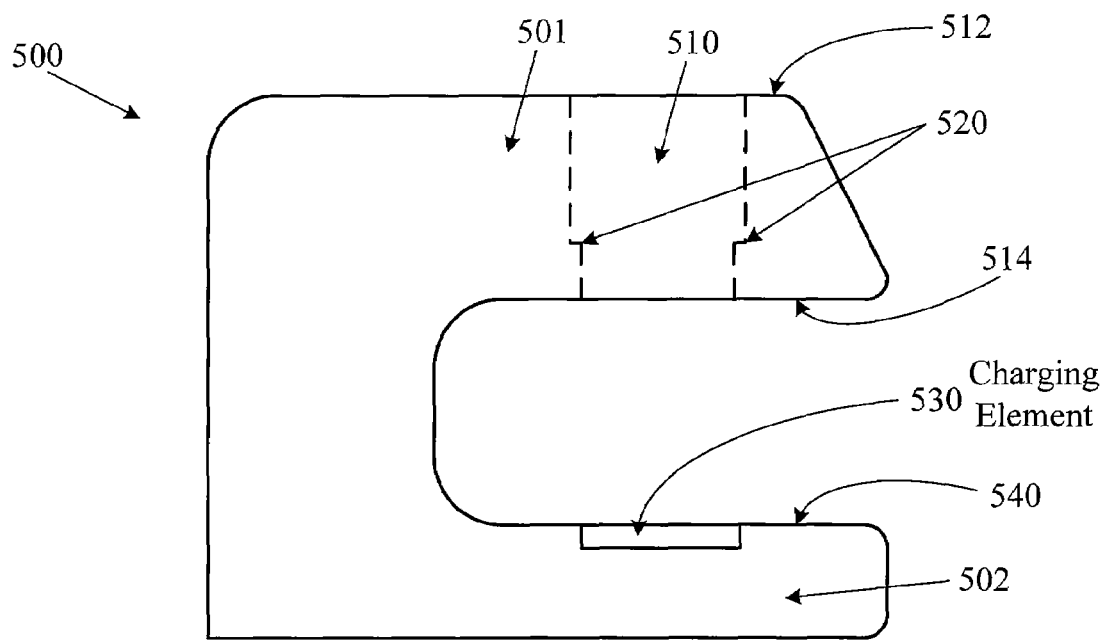
FIG. 5 is a side cross section view of a C-shaped charging base according to an embodiment of the present invention.

FIG. 5 is a side cross section view of a C-shaped charging base according to an embodiment of the present invention. In FIG. 5, charging base 500 is generally in the shape of the letter "C" and has an upper part 501 and a lower part 502. Upper part 501 has an upper surface 512 and a lower surface 514. Charging base 500 has an opening 510 extending from upper surface 512 of upper part 501 to lower surface 514 of upper part 501. A rechargeable assembly may be inserted into opening 510. Opening 510 includes a notch 520. Charging base 500 also includes a charging element 530 and a surface 540 located in lower part 502.

Charging base 500 is generally C-shaped as shown and has an upper part 501 that includes opening 510 and a lower part 502 that includes charging element 530. Upper part may also be shaped with a slanting front section as shown. Opening 510 is shaped to accept a rechargeable assembly. When the rechargeable assembly is generally cylindrical in shape, then opening may also be generally cylindrical in shape. Opening 510 is configured to receive a rechargeable assembly and to hold it in the positions shown in FIGS. 7 and 8. Notch 520 is located on the surface of charging base 500 bounded by opening 510. Notch 520 may be implemented as one or more tabs or protrusions. Notch may also extend around the entire periphery of opening 510. Notch 510 is located where the two different widths of opening 510 meet. In this manner, opening 510 has two different widths—a larger upper width and a smaller lower width. Charging element 530 is flush with surface 540 to facilitate sanitary conditions and ease of cleaning.

Charging base 500 is typically made of a plastic or polymer material that can be easily cleaned. Charging base 500 may also be encased in a waterproof housing so that it can be submerged in water. This housing may be coated so that it repels liquids such as water. It may also be coated or embedded with a bacterial-resistant material to maintain a sterile condition. In one embodiment, a silver embedded polymer may be employed. Other materials suitable for autoclaving may also be employed to make charging base 500.

Figure 6:
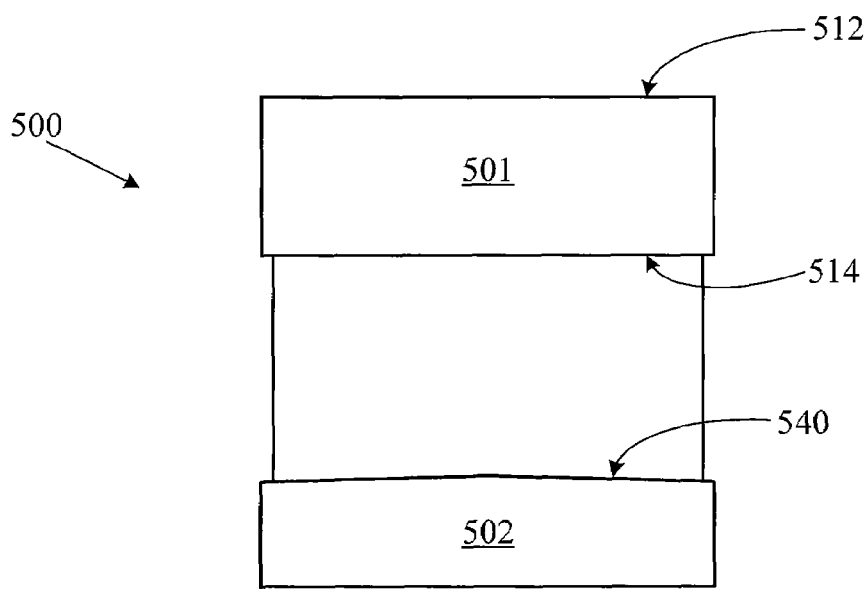
FIG. 6 is a front view of a C-shaped charging base according to an embodiment of the present invention.

FIG. 6 is a front view of a C-shaped charging base according to an embodiment of the present invention. In FIG. 6, surface 540 is beveled. This beveling allows liquids to shed off surface 540. A slight peak in or near the middle of surface 540 slopes gradually to the right and left hand sides of surface 540.

Figure 7A:
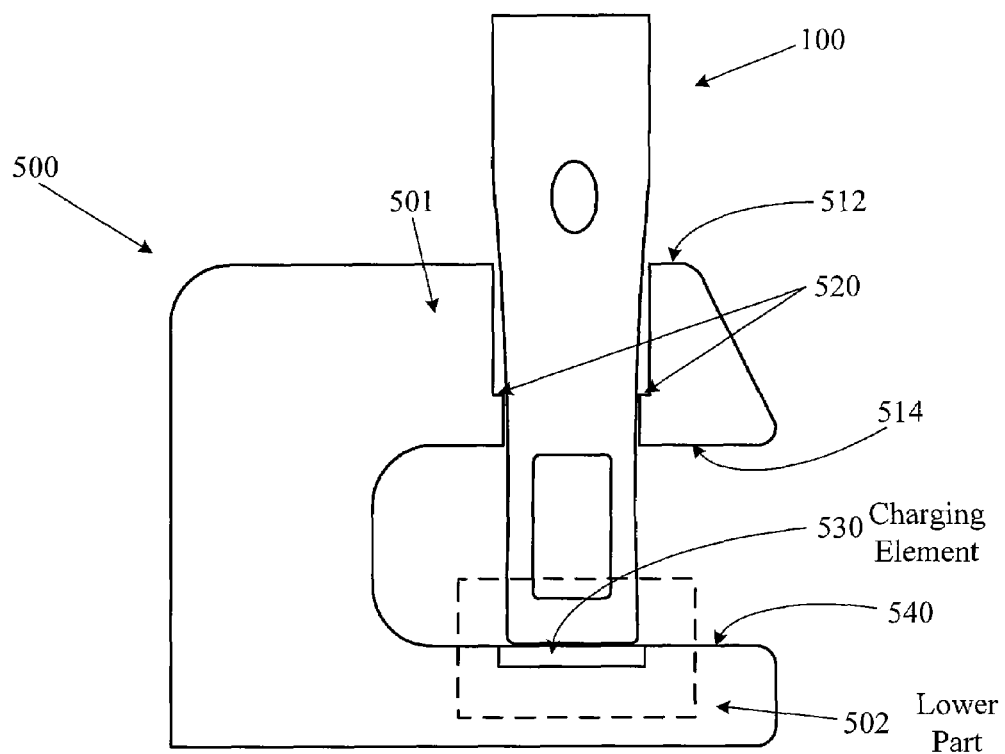
FIG. 7A is a side view of a C-shaped charging base holding a rechargeable assembly according to an embodiment of the present invention.

FIG. 7A is a side view of a C-shaped charging base holding a rechargeable assembly according to an embodiment of the present invention. Rechargeable assembly 100 is received in opening 510 and held such that its bottom surface rests on or just above charging element 530. Notch 520 and surface 540 are also depicted.

In FIG. 7A, notch 520 is configured so that rechargeable assembly 100 is held so that its bottom surface rests on or just above charging element 530. The tapered design of rechargeable assembly 100 and the configuration of notch 520 allow the rechargeable assembly 100 to be held in such a position. In this position, rechargeable assembly 100 is held securely in place so that it can be recharged by charging base 500.

Figure 7B:
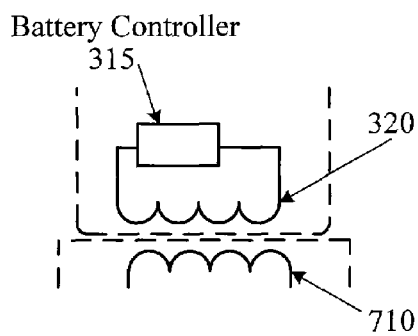
FIGS. 7B and 7C are detail cross section views of a C-shaped charging base holding a rechargeable assembly according to an embodiment of the present invention.
Figure 7C:
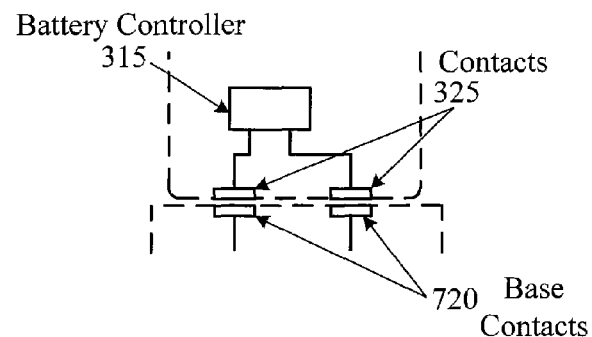

FIGS. 7B and 7C are detail cross section views of a portion of a C-shaped charging base holding a rechargeable assembly according to an embodiment of the present invention. These views correspond to the dashed rectangle in FIG. 7A. FIG. 7B depicts an inductive charging system. FIG. 7C depicts a charging system utilizing contacts.

In FIG. 7B, base inductive element 710 induces a current in inductive element 320 to charge the battery. As is commonly known, the two inductive elements 320, 710 are magnetically coupled so that a current passing through one element induces a current in the other element. This induced current can be used to charge a battery. Base inductive element 710 is located just beneath surface 540.

In FIG. 7C, the battery is charged by a direct electrical connection between contacts 325 on rechargeable assembly 100 and base contacts 720. As noted, any suitable type of electrical contacts may be employed. Base contacts 720 are flush with surface 540.

Figure 8:
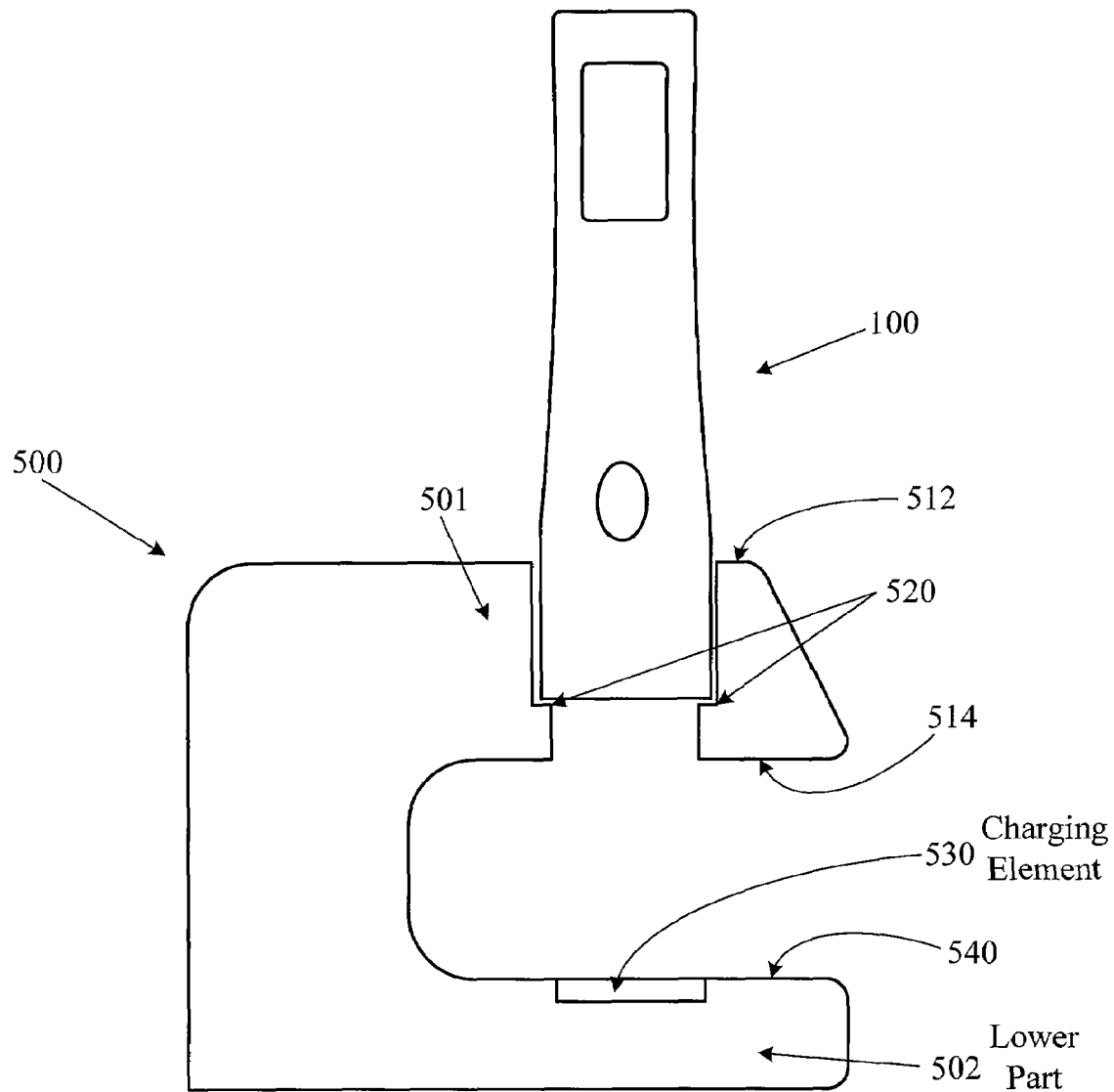
FIG. 8 is a side view of a C-shaped charging base holding a rechargeable assembly according to an embodiment of the present invention.

FIG. 8 is a side view of a C-shaped charging base holding a rechargeable assembly according to an embodiment of the present invention. In this configuration, notch 540 supports the wider end of rechargeable assembly 100. Rechargeable assembly 100 is thus held in an ergonomic position. In this position, rechargeable assembly 100 can be easily grasped and used. When in this position, it is also apparent that rechargeable assembly 100 has been charged and is ready for use.

From the above, it may be appreciated that the present invention provides an improved charging base for use with medical devices. The present invention provides a charging base configured for easy cleaning. The charging base of the present invention is also designed to maintain sanitary conditions. The present invention is illustrated herein by example, and various modifications may be made by a person of ordinary skill in the art.

While the present invention is described in the context of a drug delivery device, the present invention encompasses any medical device. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A charging base comprising:
   a generally C-shaped housing with an upper part and a lower part, the upper part having an upper surface substantially parallel to a lower surface, an opening extending from the upper surface of the upper part to the lower surface of the upper part, the opening having a first width and a second width, the opening having a notch located at the intersection of the first width and the second width, the lower part having a beveled surface generally parallel to and beneath the lower surface of the upper part; and
   a charging element located beneath the beveled surface of the lower part, the charging element for providing power to recharge a battery;
   wherein the opening and notch are configured to hold a rechargeable assembly alternately in a first charging position and a second ready position.

2. The charging base of claim 1 wherein the charging element comprises contacts located flush with the upper surface of the lower part.

3. The charging base of claim 1 wherein the charging element comprises a coil located beneath the upper surface of the lower part.

4. The charging base of claim 1 wherein the housing is made of a polymer material.

5. The charging base of claim 1 wherein the housing includes a bacteria-resistant material.

6. The charging base of claim 1 wherein the notch comprises one or more tabs.

7. The charging base of claim 1 wherein the notch is located around an interior surface of the opening.

8. The charging base of claim 1 wherein the beveled surface is configured to shed liquid.

9. The charging base of claim 1 wherein in the first charging position, a rechargeable assembly is located over the charging element and in the second ready position, the rechargeable assembly is located in a position that extends upward from the upper surface of the upper part.

10. A charging system comprising:
    a charging base and a rechargeable assembly, the charging base comprising:
    a generally C-shaped housing with an upper part and a lower part, the upper part having an upper surface substantially parallel to a lower surface, an opening extending from the upper surface of the upper part to the lower surface of the upper part, the opening having a first width and a second width, the opening having a notch located at the intersection of the first width and the second width, the lower part having a beveled surface generally parallel to and beneath the lower surface of the upper part; and
    a charging element located beneath the beveled surface of the lower part, the charging element for providing power to recharge a battery;
    the rechargeable assembly comprising:
    a generally tapered housing; and
    a rechargeable battery located in the generally tapered housing;
    wherein the opening and notch are configured to hold the rechargeable assembly alternately in a first charging position and a second ready position.

11. The charging system of claim 10 wherein the charging element comprises contacts located flush with the upper surface of the lower part.

12. The charging system of claim 10 wherein the charging element comprises a coil located beneath the upper surface of the lower part.

13. The charging system of claim 10 wherein the generally C-shaped housing is made of a polymer material.

14. The charging system of claim 10 wherein the generally C-shaped housing includes a bacteria-resistant material.

15. The charging system of claim 10 wherein the notch comprises one or more tabs.

16. The charging system of claim 10 wherein the notch is located around an interior periphery of the opening.

17. The charging system of claim 10 wherein the beveled surface is configured to shed liquid.

18. The charging system of claim 10 wherein in the first charging position, the rechargeable assembly is located over the charging element and in the second ready position, the rechargeable assembly is located in a position that extends upward from the upper surface of the upper part.

19. A charging system comprising:
    a charging base and a rechargeable assembly, the charging base comprising:

a generally C-shaped housing with an upper part and a lower part, the upper part having an upper surface substantially parallel to a lower surface, an opening extending from the upper surface of the upper part to the lower surface of the upper part, the opening having a first width and a second width, the opening having a notch located at the intersection of the first width and the second width, the lower part having a beveled surface generally parallel to and beneath the lower surface of the upper part, the lower surface configured to shed liquid; and a charging element located beneath the beveled surface of the lower part, the charging element for providing power to recharge a battery;

the rechargeable assembly comprising:

a generally tapered housing; and a rechargeable battery located in the generally tapered housing;

wherein the opening and notch are configured to hold the rechargeable assembly alternately in a first charging position in which the rechargeable assembly is located over the charging element, and a second ready position in which the rechargeable assembly is located in a position that extends upward from the upper surface of the upper part.

* * * * *